United States Patent [19]
Yano et al.

[11] 3,743,769
[45] July 3, 1973

[54] MAGNETIC TAPE PRINTER

[75] Inventors: Osahiko Yano, Kadoma-shi; Kukashi Kobayashi, Hirakata-shi, both of Japan

[73] Assignee: Matsushita Electric Industrial Co. Ltd., Osaka, Japan

[22] Filed: Jan. 26, 1971

[21] Appl. No.: 109,921

[30] Foreign Application Priority Data

Feb. 6, 1970 Japan ............................... 45/10833

[52] U.S. Cl. ........................ 178/6.6 A, 179/100.2 E
[51] Int. Cl. ..... G11b 5/86, G11b 21/00, H04n 5/78
[58] Field of Search ................................ 178/6.6 A; 179/100.2 B, 100.2 E; 340/174.1 B, 174.1 P

[56] References Cited

UNITED STATES PATENTS

| | | | |
|---|---|---|---|
| 3,257,504 | 6/1966 | Bounsall | 179/100.2 B |
| 3,627,917 | 12/1971 | Sugaya | 179/100.2 E |

OTHER PUBLICATIONS

"Magnetic Tape Duplication", by Sugaya, IEEE Transactions on Magnetics, Vol. Mag-5, No. 3, September, 1969, pp. 437–441.

*Primary Examiner*—James W. Moffitt
*Attorney*—Stevens, Davis, Miller & Mosher

[57] ABSTRACT

A magnetic tape printer for printing the magnetic information recorded in a master tape onto a slave tape by bringing both tapes into contact with the respective magnetic layers facing and then imposing a magnetic field or heat on the registered tapes, the said magnetic information including, for example, a video signal, an audio signal and a control signal; characterized in that the said tape printer includes means for compensating the inherently deficient printing effect for signals of comparably longer wavelengths such as an audio signal or a control signal.

6 Claims, 4 Drawing Figures

MAGNETIC TAPE PRINTER

This invention relates to a magnetic tape printer, particularly to such a printer for printing the magnetic information recorded on a master tape onto a slave tape by bringing both tapes into contact with the respective magnetic layers facing and then imposing a magnetic field or heat on the registered tapes.

As a magnetic tape printer of the above-mentioned tape operates satisfactorily regardless of the form of pattern of the record, it can be used for printing from a master tape such as a video tape that has recorded tracks inclined in relation to the direction in which the tape runs. However, such a tape printer has an inherent drawback in that the printing effectiveness is low for signals of long wavelength. Further, if the printing is performed by the bifilar printing system according to which a master tape and a slave tape are simultaneously wound on a reel with the respective magnetic layers in mutual contact and heat or a magnetic field is imposed on a section of the registered tapes during the winding or on the roll of the wound tapes after the winding, the printed record would suffer from the interlayer print for signals of long wavelength, a phenomenon that the magnetic record on a layer is printed on farther layers than the adjacent magnetic layer.

Accordingly, if the master tape is a video tape recorded by means of a video tape recorder and therefore includes tracks of longer wavelength signals such as the control signal and the audio signal, such signals will not be satisfactorily printed, resulting in a low output level and poor signal-to-noise ratio of the reproduced control signal which lead to unstable synchronization in the tracking control. Further, the thus recorded audio signal will provide poor output in the lower frequency range during reproduction to cause a distortion in the audio output.

An object of this invention is to provide means for compensating for the insufficient printing effect for the long wavelength components of the signals in the above-mentioned printing process.

Another object of this invention is to provide means for compensating for the interlayer print of the long wavelength components of the signals in the bifilar printing process.

In order to achieve the above objects, the magnetic tape printer of this invention comprises means for laying a slave tape upon a master tape with the respective magnetic layers in mutual contact, said master tape having first and a second information tracks recorded thereon, said first information track mainly containing signals of shorter wavelength and said second information track mainly containing signals of longer wavelength, means for imposing a magnetic field or heat on the registered tapes to print the information of the master tape onto the slave tape, first and a second magnetic heads mutually spacedly disposed along and adjacent to the second information track of the printed slave tape, the first magnetic head being nearer to said printing means, and a correction circuit for processing the signal reproduced by means of said first magnetic head and providing a correction signal to said record magnetic head.

This invention will be described in detail hereunder in connection with embodiments of the invention and with reference to the accompanying drawings, in which.

Figure 1:
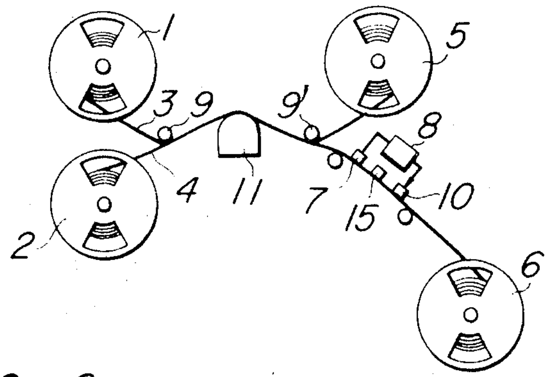
FIG. 1 is a plan view of an embodiment of the tape printer according to this invention.

Referring to FIG. 1, reference numeral 1 designates a supply reel for a roll of recorded master tape and 2 a supply reel for a roll of non-recorded slave tape. The master tape 3 and the slave tape 4 unwound from the respective reels are brought in contact with the magnetic layers mutually facing by the aid of guide posts 9, 9' and transported through a printing stand 11 which may be a magnetic field generator or a heating means and they are then wound on the respective takeup reels 5, 6. During the transportation of both tapes in mutual contact through the printing stand 11, the magnetic signal recorded on the master tape is printed onto the slave tape.

Figure 2:
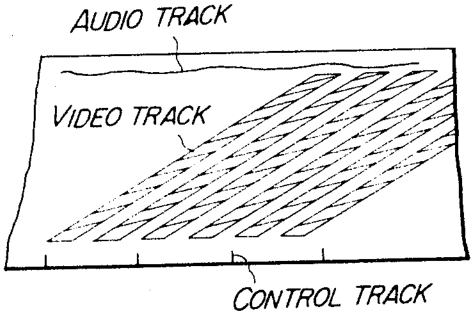
FIG. 2 is a schematic diagram of a portion of a magnetic tape showing the latent pattern of signal tracks recorded through a video tape recorder.

If the master tape is a magnetic tape recorded through a video tape recorder and has a pattern of signal tracks as shown in FIG. 2, the video track mainly contains signal of shorter wavelength as the video signal has been frequency modulated, and a satisfactory print can be expected. On the other hand, as for the control track or the audio track recorded in the marginal portions of the tape and mainly containing signal of longer wavelength, a satisfactory printing result cannot be expected as the printing action is inherently less effective for signal of longer wavelength.

The above-mentioned deficient printing effect for the signal of longer wavelength is compensated for in the following manner. Namely, the control signal for example, printed on the slave tape 4 is picked up by means of a magnetic head 7 disposed adjacent to the control track of the printed slave tape. The reproduced control signal is processed in a correction circuit 8 as will be described hereinafter, and then the processed control signal is returned to the slave tape through another magnetic head 10 which is disposed along the slave tape apart from the first magnetic head 7 by one signal interval or an exact multiple thereof.

Figure 4:
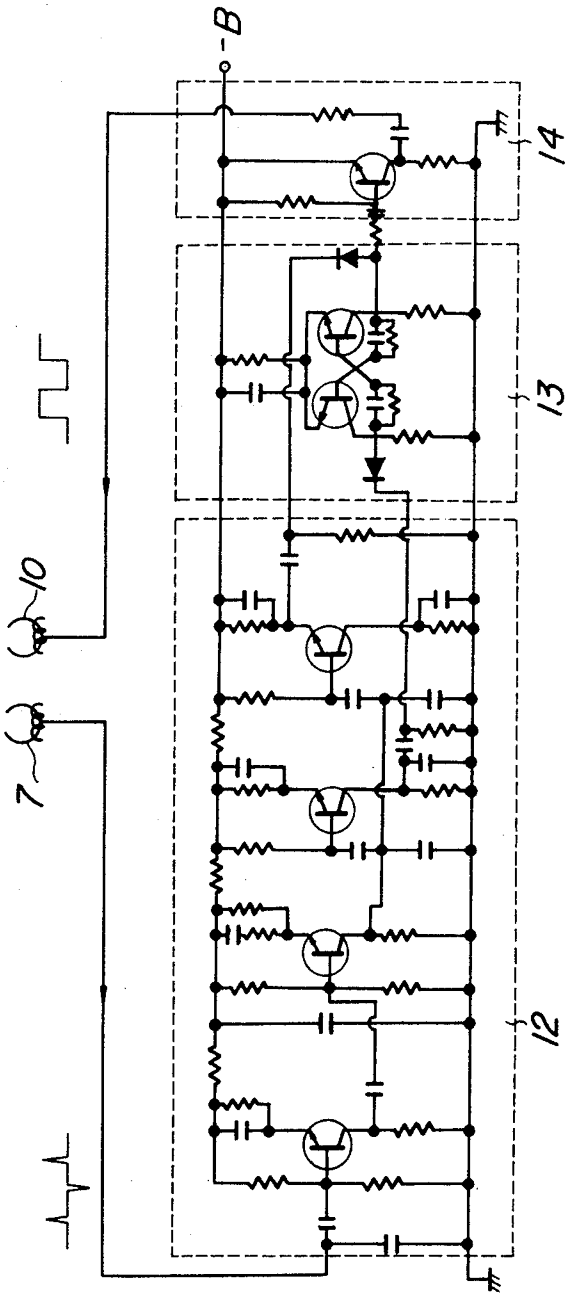
FIG. 4 is an example of an electric connection diagram of the essential part of this invention.

An example of the above-mentioned correction circuit 8 is shown in FIG. 4. During the reel-to-reel transportation of the printed slave tape, the 30 Hz control signal is reproduced from the control track of the tape by means of the pickup head 7. As the reproduced signal is a differentiated version of the control signal, it consists of positive and negative pulses found at the positions corresponding to the front and back walls of the square waves of the 30 Hz control signal. This signal is amplified in an amplifying and reversing circuit 12; and the amplified negative pulses are applied to one input terminal of a flip-flop 13, while the positive pulses are given to the other input of the flip-flop after the polarity of the pulses is reversed. Thus, a square wave signal corresponding to the control signal appears across the output terminals of the flip-flop. This square wave signal is amplified through a further amplifier 14 and led to the recording head 10 for saturation recording on the tape. Namely, the control signal is reprinted in the desired state. Though it is preferable to dispose two magnetic heads apart from each other by a distance corresponding to one cycle period of the control signal or an exact multiple thereof, this requirement is not essential. The shift of the control signal from the original position in the printed tape can be compensated by adjusting the phase shifter of the tracking control in a VTR when the printed tape is played back. It will have been seen from the above description that the control signal is reprinted at substantially the same relative position as that in the master tape regardless of the speed of the running tape.

If the tapes are driven at high speed in order to speed up the printing operation, the magnetic heads 7, 10 are required to be in good contact with the slave tape to avoid the occurrence of signal dropout. In order to prevent dropout completely, the following measures can be taken, assuming that the tape speed is set constant. Namely, the flip-flop 13 of the correction circuit shown in FIG. 4 is replaced by an astable multivibrator, the free oscillation frequency of the multivibrator being set at a value slightly lower than the signal frequency of the control signal reproduced through the magnetic head 7 at the specified tape speed, and both input terminals being connected with the respective output terminals of the amplifying and reversing circuit 12 as in the previously-described system. If a few pulses drop out in the reproduced control signal, the multivibrator will provide alternative signal.

In FIG. 1, reference numeral 15 designates a magnetic head for erasing the control signal after the signal is picked up by the head 7 and before it is recorded again by the head 10. It will be understood that the erasing head 15 is dispensed with if the recording by the head 10 is performed by saturation recording.

Though the correction of the printed signal of longer wavelength has been described above with respect to the control signal, the same principle can be applicable to the correction of the audio signal printed on the slave tape. In this case too, the pickup head, erasing head and recording head are provided in the same manner as described above. The audio signal picked up by the pickup head is processed in, for example, an emphasis circuit to be compensated for deficient printing in the lower frequency range and is then fed to the recording head to be recorded again on the tape.

Figure 3:
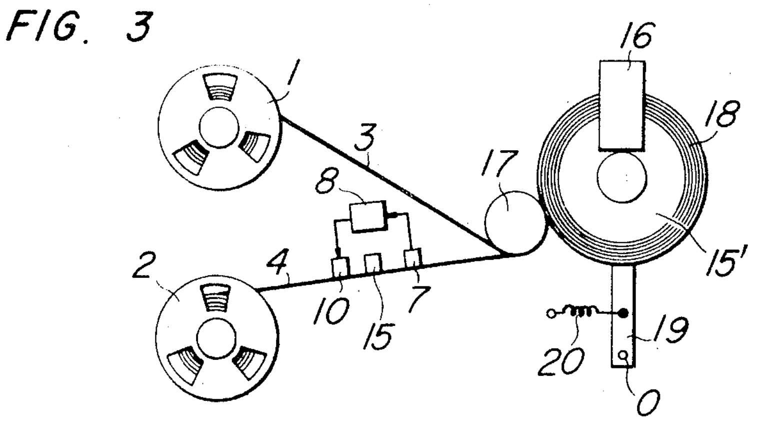
FIG. 3 is a plan view of another embodiment of the tape printer of this invention.

FIG. 3 shows another embodiment of the tape printer of this invention. The tape printing system as described above in connection with FIG. 1 is not quite suitable for the high speed printing. If the master and slave tapes are fast driven to raise the printing efficiency, the tapes are apt to catch air therebetween. The thus formed air film hampers good contact of both tapes. Moreover, at high speed, unequal advance of the tapes or vibration are apt to occur, resulting in a sort of blur in the printed signal which is a cause of the possible low output in the reproduction. Such drawbacks have been obstructing wider use of the printing system as shown in FIG. 1. Such a problem is solved by the tape printer of the type as shown in FIG. 3.

In FIG. 3, components equal to those shown in FIG. 1 are designated by corresponding reference numerals. The master tape 3 and the slave tape 4 unwound from the respective supply reels 1, 2 are wound together on a common takeup reel 15′ with the respective magnetic layers in mutual contact. After the tapes 3, 4 are completely wound on the reel 15′, the printing is carried on with the magnetic field generated by a magnetic field generator 16 or a heating means. During the winding of the tapes onto the reel 15′, a pressure roller 17 is constantly pressed on the roll 18 of the wound tapes so as to push out the air caught between tapes, as the tapes are wound. Thus, a good contact between the master and slave tapes is ensured. It will be seen in FIG. 3 that the takeup reel 15′ is supported on an arm 19 which is swingable around a pivot O and urged toward the pressure roller 17 by means of a spring 20. Therefore, the outer layers of the roll 18 are constantly pressed by the roller 17. The system of the present embodiment is entirely free from troubles such as unequal running of the tapes and vibration which are acute problem in the system of the first embodiment. This is because the the printing in the second embodiment is performed in the stationary state of the tapes when both tapes have been wound on a common reel and the relative position of both tapes is fixed.

However, if the printer of the tape of the second embodiment is used for printing a video tape which contains three tracks of video, audio and control, another problem regarding the interlayer print will arise concerning the control and the audio tracks, while no trouble is found as to the video track which mainly contains signal of shorter wavelength. As mentioned before, the interlayer print is caused by the fact that longer wavelength components of the magnetic signal recorded on the master tape affect the next farther layer than the nearest magnetic layer of the wound slave tape and are printed on the farther layer by the action of the printing magnetic field. The interlayer print is only significant for signals of longer wavelength.

This problem can be solved by substantially the same measures as described above in connection with the first embodiment. Namely, after the printing, the master and slave tapes wound together on the reel 15′ are rewound back to the respective supply reels 1, 2. Along the course of the slave tape are provided a pickup head 7 and a recording head 10 (and erasing head 15 if necessary) facing the control track or the audio track of the printed tape. The signal of longer wavelength printed on the slave tape is reproduced through the pickup head 7 and returned to the tape through the recording head 10 after being properly processed in the signal correction circuit 8 in the same manner as described in connection with the first embodiment of the invention.

What we claim is:

1. A magnetic tape printer comprising means for laying a slave tape upon a master tape with the respective magnetic layers in mutual contact, said master tape having first and second information tracks recorded thereon, said first information track mainly containing signal of shorter wavelength and said second information track mainly containing control signal of longer wavelength, means for imposing a magnetic field or heat on the register tapes to print the information of the master tape onto the slave tape, first and second magnetic heads mutually spacedly disposed along and adjacent to the second information track of the printed slave tape, the first magnetic head being nearer to said printing means, and a correction circuit for processing the signal reproduced by means of said first magnetic head and providing a correction signal to said second magnetic head.

2. A magnetic tape printer as defined in claim 1, wherein said first information track contains a frequency modulated video signal and said second information track contains a track of the control signal, and said first and second magnetic heads are disposed along and adjacent to said track of the control signal.

3. A magnetic tape printer as defined in claim 2, wherein said correction circuit comprises an amplifier for amplifying the signal reproduced by means of said first magnetic head and a flip-flop driven by said reproduced and amplified signal.

4. A magnetic tape printer as defined in claim 2, wherein said correction circuit comprises an amplifier for amplifying the signal reproduced by means of said first magnetic head and an oscillator the free oscillation frequency of which is set at a value slightly lower than the frequency of the reproduced signal and which oscillates in synchronization with the reproduced signal.

5. A magnetic tape printer comprising means for winding together a master tape and a slave tape from respective supply reels onto a single takeup reel with the respective magnetic layers in mutual contact, said master tape having first and second information tracks recorded thereon, said first information track mainly containing a signal of shorter wavelengths and said second information track mainly containing a control signal consisting of pulses spaced at equal intervals, means for imposing a magnetic field on the tapes wound on said takeup reel so as to effect the printing of the information, means for rewinding the master and slave tapes wound on said takeup reel back to the respective supply reels, means for reproducing the control signal of said second information track of the printed slave tape in the course of said rewinding, means for processing the control signal reproduced by said reproducing means, and means for recording said processed signal on said printed slave tape, said means being disposed along the slave tape apart from said reproducing means by one control signal interval or an exact multiple thereof.

6. A magnetic tape printer as defined in claim 5 wherein the means for processing the signal reproduced by said reproducing means comprises an emphasis circuit for compensating said reproduced signal for a deficient signal level in the lower frequency range.

* * * * *